United States Patent [19]

Hilbert

[11] 3,772,479

[45] Nov. 13, 1973

[54] GAIN MODIFIED MULTI-CHANNEL AUDIO SYSTEM

[75] Inventor: Francis H. Hilbert, Addison, Ill.

[73] Assignee: Motorola, Inc., Franklin Park, Ill.

[22] Filed: Oct. 19, 1971

[21] Appl. No.: 190,492

[52] U.S. Cl. ..................179/1 GQ, 179/100.4 ST, 179/100.1 TD

[51] Int. Cl. .......................................... H04r 5/00

[58] Field of Search.............. 179/1 GQ, 1 G, 1 GP, 179/1 D, 1 VL, 100.4 ST, 100.1 TD; 333/28 R, 28 T, 17; 325/305

[56] References Cited

UNITED STATES PATENTS

| | | | |
|---|---|---|---|
| 2,126,929 | 8/1938 | Snow | 179/1 G |
| 3,708,631 | 1/1973 | Bauer | 179/1 GQ |
| 3,632,886 | 1/1972 | Scheiber | 179/1 G |
| 2,098,561 | 11/1937 | Beers | 179/1 G |
| 3,184,550 | 5/1965 | Rogers | 179/1 G |

*Primary Examiner*—William C. Cooper
*Assistant Examiner*—Thomas D'Amico
*Attorney*—Vincent J. Rauner

[57] ABSTRACT

A stereo-effect enhancement system for increasing the apparent spatial separation in a multi-channel audio system includes variable gain amplifiers and comparator circuits which compare the amplitudes of the audio input signals and adjust the gain of the variable gain amplifiers in accordance with the ratio of the amplitudes of the audio input signals. Spatially expanded two channel stereo, pseudo three channel stereo, pseudo four channel stereo or automatic stereo balance control may be achieved by variously combining the audio signals from the enhancement system with the unmodified audio input signals.

2 Claims, 7 Drawing Figures

GAIN MODIFIED MULTI-CHANNEL AUDIO SYSTEM

BACKGROUND

This invention relates generally to audio reproduction systems, and more particularly to multi-channel audio systems.

Several techniques for providing a stereo-effect enhancement are known. In one such system the gain of the audio amplifiers is varied in accordance with the phase difference between the audio input signals. In another such system, the audio signals are cross coupled between amplifiers in reverse phase to cancel like components in the opposite channel.

Whereas these techniques provide some increase in the apparent stereo separation, there is a need for a system which provides a more dramatic increase in the separation.

SUMMARY

Accordingly, it is an object of the present invention to provide a stereo-effect enhancement circuit that provides an apparent increase in the physical separation of the audio transducers in a multi-channel stereo audio reproduction system.

It is a further object of this invention to provide a stereo-effect enhancement circuit that operates independently of the absolute value of the audio input signals.

It is another object of this invention to provide stereo enhancement by differentially adjusting the gain of the audio amplifiers in accordance with the ratio of the amplitudes of the stereo audio input signals.

It is yet another object of this invention to provide an automatic stereo balance control.

In accordance with a preferred embodiment of the invention, the amplitude of each audio input signal is detected, and current proportional to the amplitude of each audio input signal is generated. Each of the aforesaid currents is passed through a semiconductor diode which generates a voltage proportional to the logarithm of the current flowing through it. These voltages are compared by differential steering amplifiers which adjust the gain of the stereo amplifiers in accordance with the difference between these voltages. Because of the logarithmic relationship between these voltages and the amplitudes of the audio input signals, the gains of the various audio amplifiers vary differentially in accordance with the ratio of the audio input signals and are independent of the absolute magnitudes of these signals.

The diodes may be coupled to the differential steering amplifiers in different ways. In one embodiment the diodes are coupled to the differential steering amplifiers in a manner to accentuate any difference in amplitude of the input signals. This is the stereo enhancement mode. Reversing the leads will tend to equalize the amplitude of the output signals. Employing this latter connection and a long time constant will provide an automatic balance control for the system.

DETAILED DESCRIPTION

Figures 1, 2, 3:
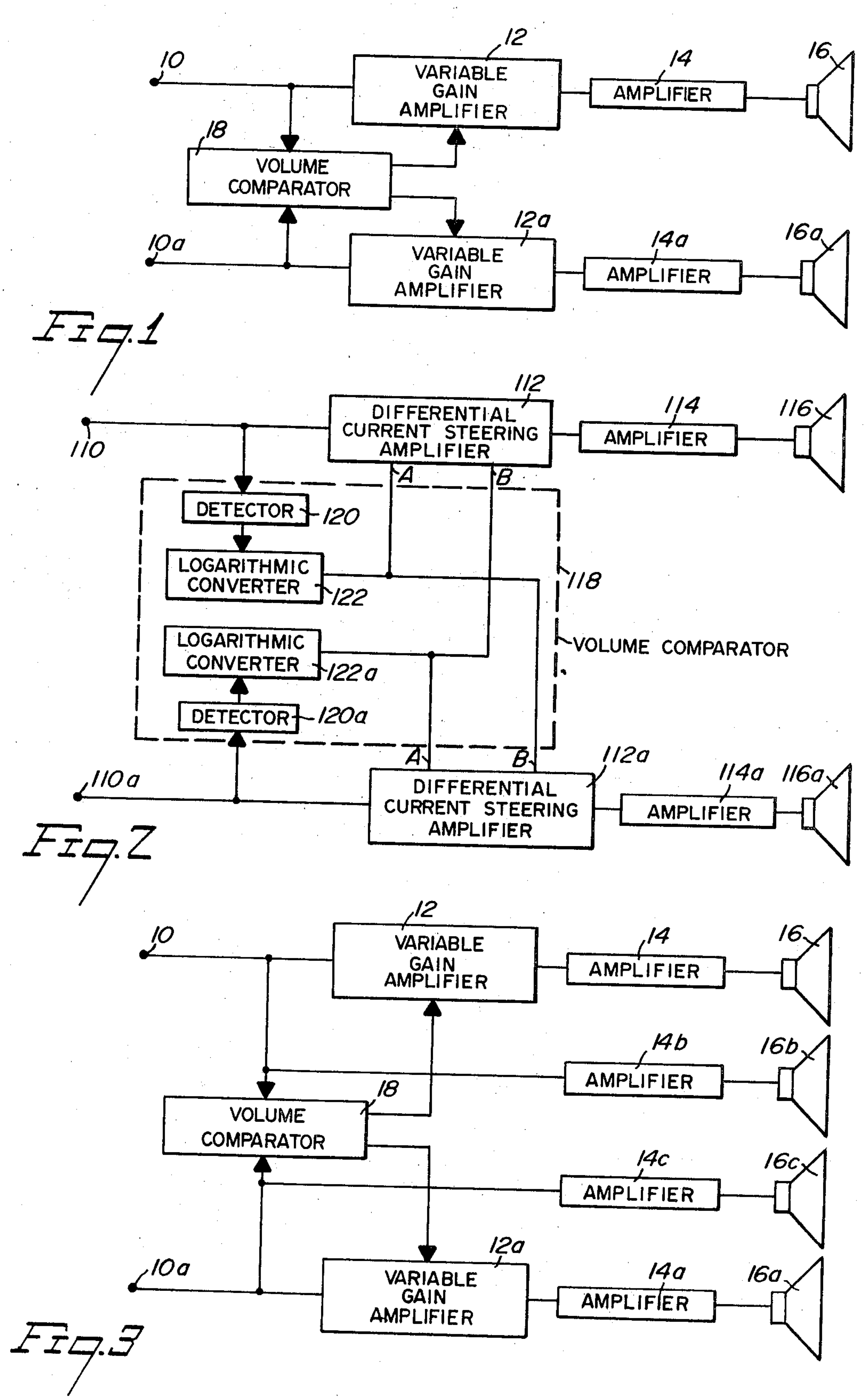
FIG. 1 is a block diagram of the audio signal modifying apparatus used in a two channel stereo system according to the invention.
FIG. 2 is a detailed block diagram of one embodiment of the audio signal modifying apparatus of FIG. 1.
FIG. 3 is a block diagram of the audio signal modifying apparatus of FIG. 1 used in a pseudo four channel stereo system according to the invention.

Referring to FIG. 1, there is shown a block diagram of a volume expanded two channel stereo system. Two stereophonically related audio signals are applied to the system at input points 10 and 10*a*. Volume comparator 18 is coupled to input points 10 and 10*a* and receives stereophonically related signals therefrom. The volume comparator compares the amplitudes of the stereophonically related signals and provides control signals proportional to the ratio of the input signals. Variable gain amplifier 12 is connected to the audio input point 10 and to volume comparator 18 and receives audio signals from point 10 and control signals from comparator 18. Similarly, a variable gain amplifier 12a is connected to input point 10*a* and to volume comparator 18 and receives audio signals from point 10*a* and control signals from volume comparator 18. The gains of variable gain amplifiers 12 and 12*a* are controlled by control signals received from volume comparator 18 to make the ratio of the gains of variable gain amplifiers 12 and 12*a* proportional to the ratio of the amplitudes of the audio input signals applied to points 10 and 10 *a*, the amplifier 12 or 12*a* associated with the larger amplitude audio input signal having the higher gain. An amplifier 14 is connected to variable gain amplifier 12 and to a transducer 16. Amplifier 14 receives the amplitude modified signal from amplifier 12 and amplifies it to a sufficient level to drive transducer 16. Similarly, an amplifier 14*a* is connected to variable gain amplifier 12*a* and to a transducer 16*a*. Amplifier 14*a* receives the signal from amplifier 12*a* and drives transducer 16*a*.

Referring to FIG. 2, there is shown in detailed block diagram form, one embodiment of the apparatus of FIG. 1. Two stereophonically related audio signals are applied to the system at input points 110 and 110*a*. A volume comparator 118 is coupled to input points 118 and 110*a* and receives the stereophonically related signals therefrom at detectors 120 and 120*a*, respectively. Detectors 120 and 120*a* provide output signals having amplitudes proportional to the amplitudes of the signals from points 110 and 110*a*, respectively. The output signals from detectors 120 and 120*a* are applied to logarithmic converters 122 and 122*a*, respectively. Logarithmic converters 122 and 122*a* provide control signals having amplitudes that are proportional to the logarithm of the output signals from detectors 120 and 120*a*, respectively. Logarithmic detectors 122 and 122*a* are each connected to both of a pair of differential current steering amplifiers 112 and 112*a*.

Logarithmic converter 122 is connected to point A of differential current steering amplifier 112 and to point B of differential current steering amplifier 112*a*. Logarithmic converter 122*a* is connected to point A of amplifier 112*a* and to point B of amplifier 112.

The difference in the amplitudes of the control voltages provided by logarithmic converters 122 and 122*a* is proportional to the difference in the logarithms of the amplitudes of the stereophonically related signals at points 110 and 110*a*. Mathematically, the difference in logarithms of two numbers is equal to the logarithm of the ratio of the two numbers. Hence, the difference in output voltages from logarithmic converters 122 and 122*a* is proportional to the logarithm of the ratio of amplitudes of the stereophonically related signals at points 110 and 110*a*.

Differential current steering amplifiers 112 and 112*a* each comprise an amplifier having gain which varies in accordance with the difference in voltage applied to the bases thereof which are denoted as points A and B in FIG. 1. A more detailed description of the operation of the differential current steering amplifiers 112 and 112*a* is given elsewhere in this disclosure.

In a preferred embodiment of the invention, the gains of differential current steering amplifiers 112 and 112*a* vary exponentially in accordance with the voltages applied between points A and B. For example, as the voltage at point A is made more positive with respect to the voltage at point B of differential current steering amplifiers 112 and 112*a*, the gain of amplifiers 112 and 112*a* will increase in accordance with the exponential of the voltage difference between points A and B. Conversely, as the voltage at point B is made positive with respect to point A, the gain of amplifiers 112 and 112*a* will decrease exponentially. The logarithmic and exponential functions are inverse functions of each other and cancel, thereby causing the gains of amplifiers 112 and 112*a* to vary in accordance with the ratio of the amplitudes of the signals applied to points 110 and 110*a*. Because converters 122 and 122*a* are reverse coupled to amplifiers 112 and 112*a*, the gain of one of amplifiers 112 and 112*a* increases as the gain of the other simultaneously decreases, the amplifier receiving the larger signal from points 110 and 110*a* having the higher gain. The gains of amplifiers 112 and 112*a* are dependent only on the ratio of the amplitudes of the signals at point 110 and 110*a* and independent of their absolute magnitudes. This causes the system to exaggerate any difference in amplitudes of the signals at points 110 and 110*a* to provide an enhanced stereo effect.

Differential current steering amplifiers 112 and 112*a* are connected to amplifiers 114 and 114*a*, respectively. Amplifiers 114 and 114*a* amplify the signals from current steering amplifiers 112 and 112*a* to a level sufficient to drive loudspeakers 116 and 116*a* which are connected to amplifiers 114 and 114*a*, respectively.

While the circuit of FIG. 2 operates to exaggerate any difference in amplitudes of the signals applied to points 110 and 110*a* to provide a stereo enhancement effect, it should be noted that reversing the connections between converter 118 and differential current steering amplifiers 112 and 112*a* will cause the circuit to reduce any difference in amplitude between the signals at points 110 and 110*a*. This feature may be used as an automatic balance control in a stereo system and still fall within the scope of the invention.

Whereas the system described above makes use of a logarithmic converter and an exponential current steering amplifier to provide expansion which varies in accordance with the ratio of the amplitudes of the stereophonically related signals applied to points 110 and 110*a*, any combination of mathematical functions to provide any desired expansion may be used and still fall within the scope of the invention.

FIG. 3 shows a four channel version of an expanded stereo system. Like numbers are used to indicate similar components in all figures. The system of FIG. 3 is similar to the system of FIG. 1 with the addition of two unexpanded stereo channels. Transducers 16 and 16*a* which provided the expanded outputs have the greatest physical separation between them, and transducers 16*b* and 16*c* are located between transducers 16 and 16*a*. The outermost channels operate in the manner described in the system of FIG. 1. In addition, amplifier 14*b* is coupled to input point 10 to receive the audio signal from that point and amplify it to drive transducer 16*b*. Similarly, amplifier 14*c* receives the audio signal from point 10*a* and drives transducer 16*c*. The transducers 16*b* and 16*c* will therefore provide a stereo effect intermediate that of transducers 16 and 16*a* for an overall pseudo four channel stereo effect.

Figure 4:
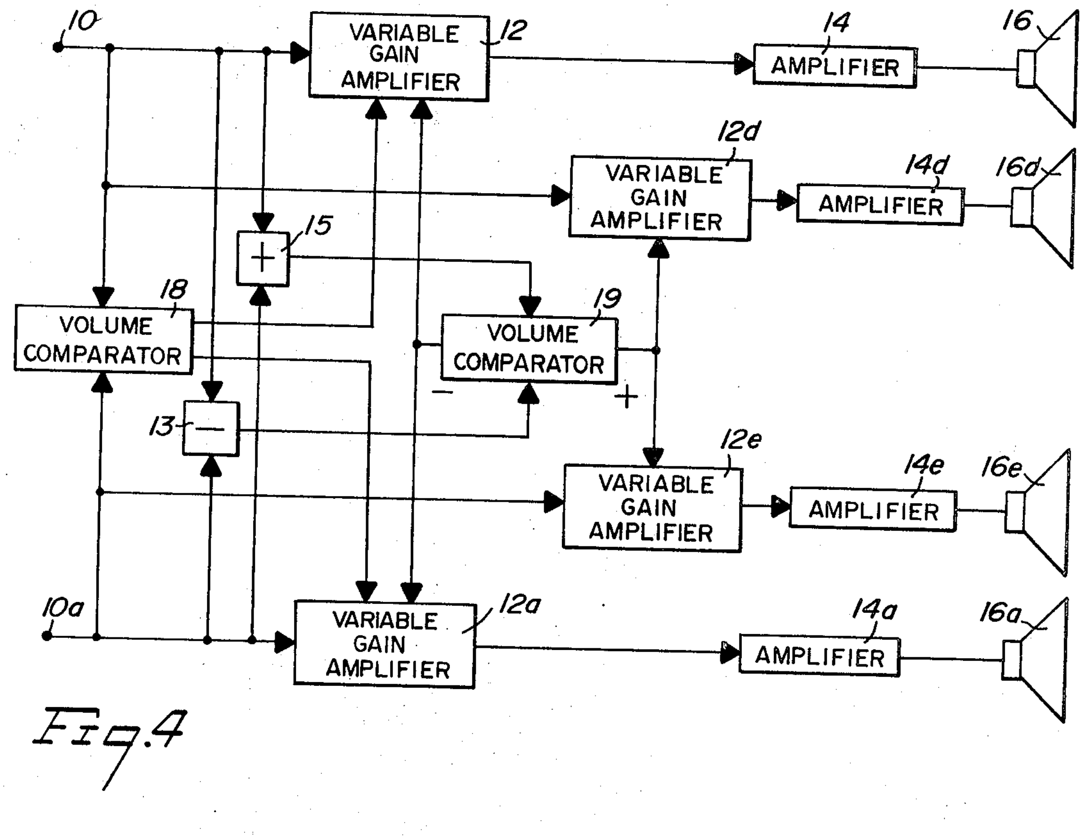
FIG. 4 is a block diagram of a pseudo four channel stereo system having audio signal modified inner channels according to the invention.

FIG. 4 shows another four channel version of an expanded stereo system. Like numbers are used to indicate similar components. The system of FIG. 4 is similar to the system of FIG. 1 with the addition of two inboard channels having variable gain amplifiers whose gains are varied as a function of the degree of correlation between the signals at point 10 and 10a. Transducers 16 and 16*a* have the greatest physical separation between them and transducers 16*d* and 16*e* are located between transducers 16 and 16*a*. The outermost channels operate in the manner described in the systems of FIGS. 1 and 3. The two additional channels include variable gain amplifiers 12*d* and 12*e*, amplifiers 14*d* and 14*e* and transducers 16*d* and 16*e*. Variable gain amplifiers 12*d* and 12*e*, coupled to points 10 and 10*a*, receive the stereophonically related signals therefrom and provide amplitude modified signals in response to control signals from comparator 19. Amplifiers 14*d* and 14*e* are connected to variable gain amplifiers 12*d* and 12*e* and to transducers 16*d* and 16*e*, respectively. The amplitude modified output signals from variable gain amplifiers 12*d* and 12*e* are received by amplifiers 14*d* and 14*e* and amplified to a sufficient magnitude to drive transducers 16*d* and 16*e*. An adding circuit 15 and a subtracting circuit 13 are connected to input points 10 and 10*a* and to comparator 19. Adder 15 and subtractor 13 receive stereophonically related signals from points 10 and 10*a* and provide output signals proportional to the sum and difference, respectively, of the signals at points 10 and 10*a*.

The output signals from adder 15 and subtractor 13 provide a measure of the degree of correlation between the signals at point 10 and 10*a*. For example, if the signals at points 10 and 10*a* are completely correlated, the output signal from adder 15 will be large, while the output signal from subtractor 13 will be zero or very small. Conversely, if the signals have negative correlation, the output signal from subtractor 13 will be larger than the output signal from adder 15. If the signals are completely uncorrelated, the output signals from adder 15 and subtractor 13 will be equal.

The output signals from adder 15 and subtractor 13 are applied to comparator 19 which has a positive and a negative output terminal. Comparator 19 is similar to comparator 18 and provides control signals in response to the difference in amplitudes of the signals applied thereto. The gains of variable gain amplifiers 12*d* and 12*e* and of variable gain amplifiers 12 and 12*a* are controlled by control signals received from comparator 19 to make the gains of amplifiers 12*d* ans 12*e* proportional to the degree of correlation between the signals at points 10 and 10*a* and the gain of amplifiers 12 and 12*a* proportional to the degree of non-correlation between the signals. For example, when the stereophonically related signals at points 10 and 10*a* have a high degree of correlation, the amplitude of the output signal from adder 15 will be larger than that from subtractor 13. When the output signals from adder 15 and subtractor 13 resulting from highly correlated signals at points 10 and 10*a* are applied to comparator 19, comparator 19 produces a control signal at its positive terminal which is applied to variable gain amplifiers 12*d* and 12*e* to cause the gain of the amplifiers to increase. Comparator 19 simultaneously produces a signal at its negative terminal which is applied to variable gain amplifiers 12 and 12*a* to reduce their gains. When there is little or no correlation between these signals at points 10 and 10*a*, the output signals from adder 15 and subtractor 13 will have similar amplitudes. When these similar amplitude signals are applied to comparator 19, the control signals from comparator 19 will cause the gain of amplifiers 12*d* and 12*e* to be reduced and the gain of amplifiers 12 and 12*a* to be increased relative to the highly correlated signal condition. The operation of this circuit will cause the correlated information to appear to be coming from the two inboard speakers 16*d* and 16*e*, and the uncorrelated information to be coming from the two outboard speakers 16 and 16*a*, thereby enhancing the overall stereo effect.

Figure 5:
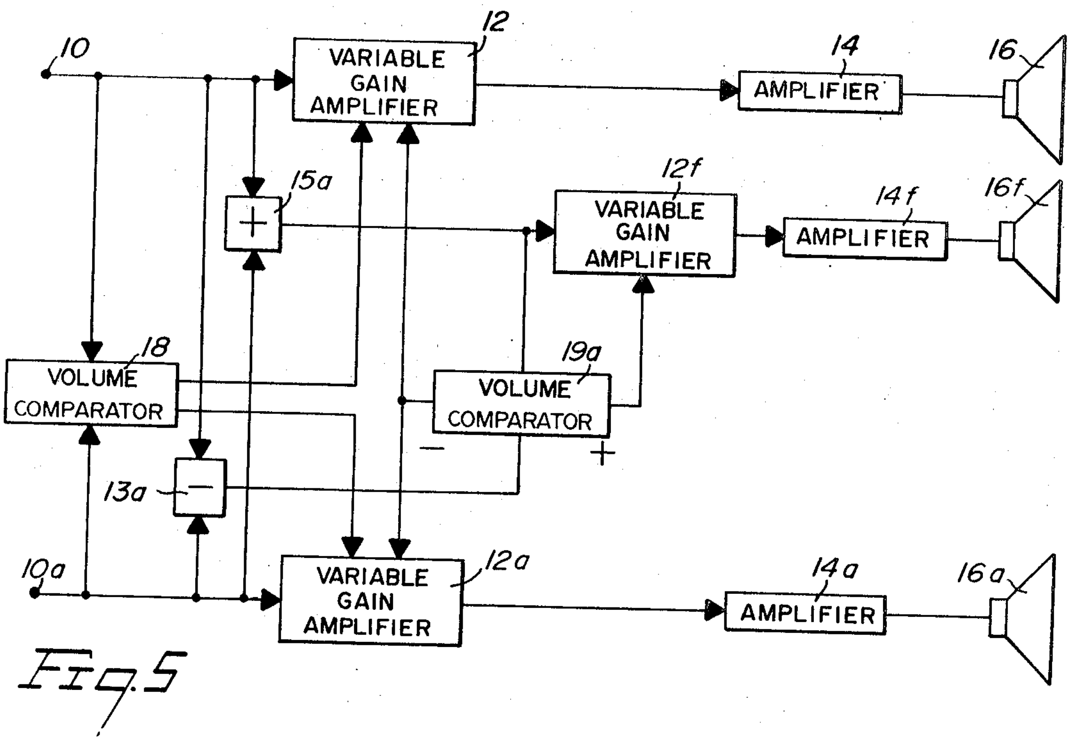
FIG. 5 is a block diagram of audio signal modifying apparatus used in a pseudo three channel stereo system according to the invention.

A similar system may be employed to provide a three channel version of the expanded stereo system. This system is shown in FIG. 5. In this embodiment, control circuitry similar to that of FIG. 4 is used. Adder 15*a*, subtractor 13*a* and comparator 19*a* are used to control a single variable gain amplifier 12*f*, similar to amplifiers 12*d* and 12*e*, wherein variable gain amplifier 12*f* receives signals from points 10 and 10*a* via adder 15*a*, which provides a signal in accordance with the sum of the signals at points 10 and 10*a*. These signals are amplified by variable gain amplifier 12*f* and amplifier 14*f* and are reproduced by loudspeaker 16*f* to provide a center channel that reproduces both of the stereophonically related signals. The gain of the center channel is varied in accordance with the degree of correlation between the two stereophonically related signals in such a manner that the gain of the center channel is increased and the gain of the outer channels is reduced when the stereophonically related input signals at points 10 and 10*a* are correlated. When uncorrelated signals are present at points 10 and 10*a*, the gain of the outer channels is increased and the gain of the center channel is reduced. This system provides an overall effect similar to that of the four channel system of FIG. 4.

Figure 6:
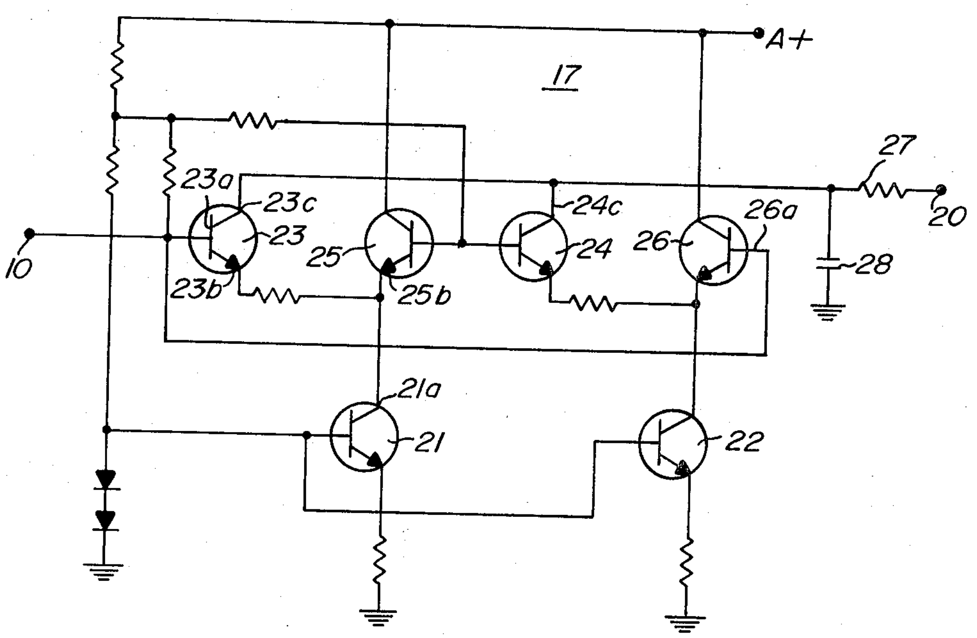
FIG. 6 is a schematic diagram of a detector circuit that provides current proportional to the amplitude of the audio input signal and which is used in the volume comparator of FIGS. 1, 2, 3, 4 and 5.
Figure 7:
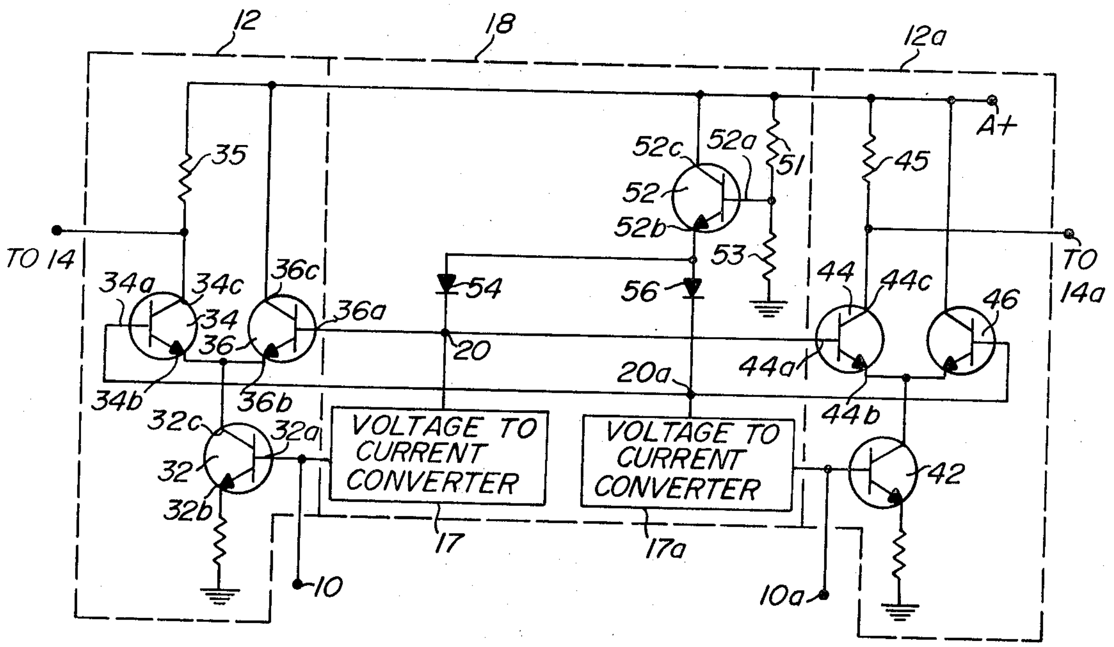
FIG. 7 is a detailed circuit diagram of the audio signal modifying apparatus according to the invention.

In order to provide a volume comparator and expander function that is dependent upon the ratio of the input signals and independent of the absolute value of these input signals, the circuits of FIGS. 6 and 7 may be employed.

FIG. 6 is a circuit diagram of a voltage amplitude to current amplitude converter 17 which can be used in the volume comparator 18. One of the stereophonically related audio input signals is applied to point 10 of the converter. The converter provides a unidirectional output current at point 20, the magnitude of which is directly proportional to the amplitude of the input voltage applied to point 10. The circuit includes two steering differential amplifier pairs, the first including transistors 23 and 25, and the second including transistors 24 and 26. The collector 21*a* of transistor 21 is coupled to the emitters 23*b* and 25*b* of transistors 23 and 25 and supplies constant current to the amplifier pair. The current is split between transistors 23 and 25 proportionally to the conductivity of the two transistors. Similarly, transistor 22 provides a current source for the second current steering differential amplifier pair comprising transistors 24 and 26 and their associated circuitry. The input signal from point 10 is coupled to the base 23*a* of transistor 23 and to base 26*a* of transistor 26. A positively increasing light voltage will cause transistors 23 and 26 to increase conductivity. Each of the two transistors then conducts a larger porportion of the current provided by its associated current source. The collector 23*c* of transistor 23 is connected to output point 20 through a resistor 27. Hence, the increased collector current conducted by transistor 23 must flow through output point 20. The magnitude of the current conducted by transistor 23 is proportional to the magnitude of the positive audio voltages applied to point 10. Negative audio input voltages applied to point 10 cause transistors 23 and 26 to reduce their conductivity thereby reducing the amount of current drawn by each. Since the current flowing through transistors 21 and 22 remains constant, the current through transistors 25 and 24 must increase by an amount equal to the reduction in current flow through transistors 23 and 26. The collector 24*c* of transistor 24 is coupled to output point 20 through resistor 27 so that the increased current through transistor 24 flows through output point 20, and is proportional to the negative voltages applied to point 10. The total current supplied by output point 20 is proportional to the sum of the currents produced by the positive and negative voltage excursions at input point 10. Capacitor 28, which is connected to collectors 23*b* and 24*b* and to resistor 27, serves to filter the current from transistors 23 and 24 so that the output current is proportional to the envelope of the input voltage and is not determined by the instantaneous value of the input voltage.

FIG. 7 is a detailed circuit diagram of one embodiment of volume comparator 18 and variable gain amplifiers 12 and 12*a* of FIGS. 1, 3, 4 and 5. Referring to the center portion of FIG. 7, there is shown the circuit of one embodiment of volume comparator 18. Input signals from the two stereo channels are applied to the input terminals 10 and 10*a*. These signals are applied to the voltage to current converters 17 and 17*a*, which may be of the construction shown in FIG. 6. The output of converter 17 at terminal 20 is coupled to the cathode of diode 54, and the anode of diode 54 is coupled to the emitter 52*b* of transistor 52. Similarly, the output of converter 17*a* at terminal 20*a* is coupled through diode 56 to emitter 52*b* of transistor 52. Resistors 51 and 53 form a voltage divider network for providing a reference voltage to transistor 52. Transistor 52 is connected in an emitter follower configuration with collector 52 connected to the power supply and base 52*a* connected to the junction of resistors 51 and 53. In this configuration, transistor 52 provides a low impedance output voltage at emitter 52*b*. The voltage at emitter 52*b* is approximately the same as the voltage applied to base 52*a*. Current flowing through point 20 of converter 17 to the emitter 52*b* of transistor 52 must flow through diode 54, and current flowing through point 20*a* of converter 17*a* flows through diode 56. Diodes 54 and 56 are semiconductor diodes having the normal exponential voltage-current characteristic of such diodes. Therefore, the voltage across the terminals of each diode is proportional to the logarithm of the current flowing through that diode. Hence, the voltage difference between points 20 and 20*a* is proportional to the difference of the logarithms of the currents flowing through points 20 and 20*a*. Since a difference in logarithms of two numbers is equal to the logarithm of the ratio of those numbers, the difference in voltage between points 20 and 20*a* is proportional to the logarithm of the ratio of the currents flowing through those points. Since the currents at point 20 and 20*a* are proportional to the voltages at points 10 and 10*a* due to the action of converters 17 and 17*a*, the voltage difference between points 20 and 20*a* is also proportional to the logarithm of the ratio of the amplitudes of the audio voltages applied to point 10 and 10a.

Variable gain amplifier 12 is a current mode, emitter coupled differential current steering amplifier including three transistors 32, 34 and 36. Transistor 32 is a current source transistor having a collector 32*c* coupled to emitters 34*b* and 36*b* of transistors 34 and 36 and providing a current path to these transistors. Base 32*a* of transistor 32 is coupled to audio input point 10 and receives the audio signals that are applied to point 10. The audio signals applied to base 32*a* vary the conductivity of transistor 32 to cause the collector current through collector 32*c* to vary in accordance with the audio voltage applied to base 32*a*. The collector current of transistor 32, which is applied to emitters 34*b* and 36*b* of transistors 34 and 36, flows through transistors 34 and 36. The relative amount of current flowing through transistors 34 and 36 is dependent upon the relative conductivity of the two transistors. Therefore, to vary the gain of current steering amplifier 12, the conductivity of transistors 34 and 36 must be varied. This is done by applying control voltage signals to bases 34*a* and 36*a* of transistors 34 and 36.

When transistor 34 is fully conductive and transistor 36 is fully nonconductive, all of the collector current from transistor 32 will flow through transistor 34. Collector 34*c* of transistor 34 is connected to a resistor 35, so that all of the current flowing through transistor 34 must flow through resistor 34, and the voltage across resistor 35 is proportional to the current flowing through it. Therefore, in the case where transistor 34 is fully conductive and transistor 36 is fully nonconductive, current variations through transistor 32 caused by variations in the audio input signal will be conducted through transistor 34 to resistor 35 and produce a voltage across resistor 35 proportional to the voltage at input point 10. The voltage across resistor 35 will be similar to the audio voltage applied to point 10, its magnitude being at a maximum when transistor 34 is fully conductive and transistor 36 is fully nonconductive. When transistor 34 is fully nonconductive and transistor 36 is fully conductive, the collector current from transistor 32 will flow entirely through transistor 36. Hence, there will be no current flow through transistor 34 or resistor 35 to provide a voltage across resistor 35. In the case where transistor 34 is fully conductive and transistor 36 is fully nonconductive, amplifier 12 will have its maximum gain to audio input signals applied to point 10. Conversely, when transistor 36 is fully conductive and transistor 34 is fully nonconductive, the gain of amplifier 12 will be at its minimum.

The difference in conductivities between transistors 34 and 36 is proportional to the exponential of the difference in the control voltages applied to bases 34*a* and 36*a*. Base 36*a* is connected to point 20 and base 34*a* is connected to points 20*a*, so that the difference in voltages between points 20 and 20*a* is applied between bases 36*a* and 34*a*. The gain of amplifier 12 is thus controlled by the voltage difference between points 20 and 20*a* which corresponds to the logarithm of the ratio of the audio voltages applied to points 10 and 10*a*. The logarithm and exponential functions are inverse transforms of each other and thereby cancel each other, making the gain of amplifier 12 directly proportional to the ratio of the amplitudes of the input signals at points 10 and 10*a*.

In a similar fashion, amplifier 12*a* is controlled by the voltage difference between points 20 and 20*a* to vary the gain of amplifier 12*a* in accordance with the ratio of the audio input signals at points 10 and 10*a*. The output signals from amplifiers 12 and 12*a* are taken from opposite collectors of the differential amplifiers. The output signal from amplifier 12 is taken from collector 34*c* of transistor 34 the base 34*a* of which is connected to point 20*a*. The output signal from amplifier 12*a* is taken from collector 44*c* of transistor 44. The base 44*a* of transistor 44 is connected to point 20. In this way, the gain of one of the amplifiers is increased while the gain of the other is decreased, the amplifier receiving the greater amplitude signal at point 10 or 10*a* having the higher gain.

Diodes 54 and 56 may be replaced with a plurality of diodes to provide greater expansion than can be provided by a single diode. For example, if diodes 54 and 56 are each replaced by a series combination of two diodes, the voltage difference between points 20 and 20*a* will be twice that which would be produced by the single diodes and the amount of expansion will be doubled. Other components may also be employed in place of diodes 54 and 56 to provide expansion characteristics which respond to characteristics of the audio input signal other than the ratio of the signals. If resistors are employed in place of diodes 54 and 56, the voltage difference between points 20 and 20*a* will be proportional to the difference in amplitude of the voltages applied to points 10 and 10*a* rather than the difference in logarithms of these voltages. When this voltage difference is applied to amplifiers 12 and 12*a*, which have an exponential response, the expansion will have an exponential characteristic. The expansion characteristic can be tailored as desired by employing the proper component or combination of components in place of diodes 54 and 56. In addition, the expansion characteristics of amplifiers 12 and 12*a* may be tailored to meet any desired requirements. For example, resistors may be connected between emitters 34*b* and 36*b* of amplifier 12 and between emitters 44*b* and 44*b* of amplifier 12*a* to provide emitter degeneration. The use of emitter degeneration tends to linearize the control characteristic of each expander, thereby making its response less exponential. Through the proper selection of emitter resistors or other components, the expansion characteristics of amplifiers 12 and 12a may be adjusted.

An automatic balance control can be realized by interchanging control points 20 and 20*a* of converters 17 and 17*a*. In this configuration, any difference in the amplitudes of the audio input signals applied to points 10 and 10a is diminished rather than accentuated as in the case of a stereo enhancement system. In addition, the capacitance of capacitor 28 of FIG. 4 is increased to provide a longer time constant, thereby making the balance control respond to the average amplitude of the audio signals applied to points 10 and 10a.

In summary, the system provides a reliable, low cost and efficient means for obtaining stereophonic enhancement. Employing the concepts of the present invention provides more realistic stereo expansion than could be heretofore achieved. The circuits involved are readily integratable to provide low cost fabrication and compact size. Many embodiments of the present invention are possible with only a few representative variations shown here. While the system according to the invention has been shown and described in conjunction with a two channel stereophonic system, it is understood that it can be used where it is necessary to vary the gain to any electrical signal in a predetermined fashion to achieve a desired result.

I claim:

1. A system for deriving a plurality of output signals from first and second stereophonically related signals from first and second signal sources, such system including in combination:

first and second variable gain amplifiers each having an input, an output and a control terminal, the input terminal of said first amplifier being connected to said first source and receiving said first stereophonically related signal, and the input terminal of said second amplifier being connected to said second source and receiving said second stereophonically related signal, each of said amplifiers having a gain that varies in accordance with a control signal applied to said control terminal;

amplitude sensing means for sensing the amplitudes of the first and second stereophonically related signals and providing control signals only to said amplifiers for simultaneously increasing the gain of one of said amplifiers and decreasing the gain of the other of said amplifiers in accordance with the ratio of the amplitudes of said first and second stereophonically related signals in a manner such that the gain of said first amplifier is greater than the gain of said second amplifier when one of said stereophonically related signals is larger, and such that the gain of said second amplifier is greater when the other of said stereophonically related signals is larger, said amplitude sensing means being connected to said first and second signal sources and receiving said first and second stereophonically related signals therefrom, and only to said first and second amplifiers and controlling the gain thereof;

means for combining said stereophonically related signals; and a third variable gain amplifier connected to said combining means and receiving said combined stereophonically related signals therefrom and providing output signals in response thereto, said third variable gain amplifier having gain which varies in accordance with a control signal applied thereto, summing means connected to each of said signal sources for receiving and adding said stereophonically related signals and providing sum signals proportional to the degree of correlation between said stereophonically related signals, difference means connected to each of said signal sources for receiving and subtracting said stereophonically related signals and providing difference signals proportional to the lack of correlation between said stereophonically related signals, and second amplitude sensing means connected to said summing means and said difference means for receiving said sum and difference signals, said second amplitude sensing means being further connected to said first, second and third variable gain amplifiers for providing control signals thereto in response to the difference between said sum signals and said difference signals, said second amplitude sensing means and said first, second and third amplifiers being interconnected in a predetermined manner thereby to increase the gain of said third amplifier relative to said first and second amplifiers when said sum signal exceeds said difference signal, and to increase the gain of said first and second amplifiers relative to said third amplifier when said difference signal exceeds said sum signal.

2. A system for deriving a plurality of output signals from first and second stereophonically related signals from first and second signal sources, such system including in combination:

first and second variable gain amplifiers each having an input, an output and a control terminal, the input terminal of said first amplifier being connected to said first source and receiving said first stereophonically related signal, and the input terminal of said second amplifier being connected to said second source and receiving said second stereophonically related signal, each of said amplifiers having a gain that varies in accordance with a control signal applied to said control terminal;

amplitude sensing means for sensing the amplitudes of the first and second stereophonically related signals and providing control signals only to said amplifiers for simultaneously increasing the gain of one of said amplifiers and decreasing the gain of the other of said amplifiers in accordance with the ratio of the amplitudes of said first and second stereophonically related signals in a manner such that the gain of said first amplifier is greater than the gain of said second amplifier when one of said stereophonically related signals is larger, and such that the gain of said second amplifier is greater when the other of said stereophonically related signals is larger, said amplitude sensing means being connected to said first and second signal sources and receiving said first and second stereophonically related signals therefrom, and only to said first and second amplifiers and controlling the gain thereof; and third and fourth variable gain amplifiers each connected to one of said signal sources to receive one of said stereophonically related signals therefrom and to provide output signals in response thereto, said third and fourth variable gain amplifiers having gain which varies in accordance with a control signal applied thereto, summing means connected to each of said signal sources for receiving and adding said stereophonically related signals and providing sum signals proportional to the degree of correlation between said stereophonically related signals, difference means connected to each of said signal sources for receiving and subtracting said stereophonically related signals and providing difference signals proportional to the lack of correlation between said stereophonically related signals, and second amplitude sensing means connected to said summing means and said difference means for receiving said sum and difference signals, said second amplitude sensing means being further connected to said first, second, third and fourth variable gain amplifiers and providing control signals thereto in response to the difference between said sum signals and said difference signals, said second amplitude sensing means and said first, second, third and fourth amplifiers being interconnected in a predetermined manner thereby to increase the gains of said third and fourth amplifiers relative to said first and second amplifiers when said sum signal exceeds said difference signal, and to increase the gains of said first and second amplifiers relative to said third and fourth amplifiers when said difference signal exceeds said sum signal.

* * * * *